(12) United States Patent
Sigmund

(10) Patent No.: US 7,841,438 B2
(45) Date of Patent: Nov. 30, 2010

(54) TURBOCHARGER ACTIVATED CLUTCH

(75) Inventor: Joshua Sigmund, Hilliard, OH (US)

(73) Assignee: Honda Motor Co., Ltd., Tokyo (JP)

(*) Notice: Subject to any disclaimer, the term of this patent is extended or adjusted under 35 U.S.C. 154(b) by 284 days.

(21) Appl. No.: 11/943,745

(22) Filed: Nov. 21, 2007

(65) Prior Publication Data
US 2009/0127013 A1 May 21, 2009

(51) Int. Cl.
B60K 17/34 (2006.01)
B60K 13/04 (2006.01)
F16D 43/28 (2006.01)

(52) U.S. Cl. ............... 180/247; 180/165; 192/85.01
(58) Field of Classification Search ............ 180/309, 180/245, 247, 165; 60/597
See application file for complete search history.

(56) References Cited

U.S. PATENT DOCUMENTS

| | | | | |
|---|---|---|---|---|
| 1,464,443 | A | * | 8/1923 | Powell .................. 417/231 |
| 1,583,621 | A | * | 5/1926 | Steinberg ................ 60/597 |
| 1,657,707 | A | * | 1/1928 | Beaulieu ................. 15/313 |
| 1,731,708 | A | * | 10/1929 | Crew .................... 416/171 |
| 2,022,026 | A | * | 11/1935 | Bragg .................... 477/32 |
| 2,359,615 | A | * | 10/1944 | Browne et al. ............ 60/600 |
| 2,380,777 | A | * | 7/1945 | Moss ..................... 60/600 |
| 2,498,910 | A | * | 2/1950 | Camfield ................ 417/380 |
| 2,622,390 | A | * | 12/1952 | Newton ................... 60/602 |
| 2,773,348 | A | * | 12/1956 | Grieshaber et al. ........ 60/600 |
| 2,849,173 | A | * | 8/1958 | Surdy ................... 417/203 |
| 4,464,947 | A | * | 8/1984 | Windsor-Smith et al. .... 74/329 |
| 4,549,470 | A | * | 10/1985 | Yogo ..................... 92/94 |
| 4,665,802 | A | | 5/1987 | Barker et al. |
| 4,674,613 | A | | 6/1987 | Sikorski |
| 4,674,615 | A | | 6/1987 | Snyder |
| 4,907,952 | A | | 3/1990 | Inoue et al. |
| 5,329,770 | A | * | 7/1994 | Ward ..................... 60/597 |
| 5,413,201 | A | | 5/1995 | Vidal |
| 5,687,824 | A | | 11/1997 | Hara et al. |
| 5,806,623 | A | | 9/1998 | Clohessy |
| 6,015,361 | A | | 1/2000 | Yamazaki et al. |
| 6,016,883 | A | | 1/2000 | Yamada |
| 6,263,995 | B1 | * | 7/2001 | Watson et al. ........... 180/248 |
| 6,289,882 | B1 | | 9/2001 | Slicker |
| 6,536,573 | B2 | * | 3/2003 | Nagler et al. ........... 192/85 R |
| 6,587,775 | B2 | | 7/2003 | Nishida et al. |
| 6,672,062 | B2 | * | 1/2004 | Shaffer ................... 60/612 |
| 6,697,725 | B1 | * | 2/2004 | Williams ................. 701/69 |
| 6,837,817 | B2 | | 1/2005 | Mori et al. |
| 6,957,535 | B2 | | 10/2005 | Sumser et al. |
| 7,111,702 | B2 | * | 9/2006 | Perlick et al. ........... 180/233 |

OTHER PUBLICATIONS

John Dinkel, Road & Track Illustrated Automotive Dictionary, (c) 2000 John Dinkel, Robert Bentley, Bentley Publishers, p. 231.*

* cited by examiner

Primary Examiner—Lesley Morris
Assistant Examiner—Wesley Potter
(74) Attorney, Agent, or Firm—Mark E. Doell, Esq.; Emerson Thomson Bennett

(57) ABSTRACT

A vehicle may have an engine that provides power for locomotion; a plurality of ground engaging wheels; a clutch assembly connected to the engine and connected to at least one of the ground engaging wheels; and a turbocharger assembly connected to the engine and connected to the clutch assembly. The turbocharger assembly is operated to engage the clutch assembly to connect, for locomotion, the engine to the ground engaging wheel.

16 Claims, 6 Drawing Sheets

TURBOCHARGER ACTIVATED CLUTCH

I. BACKGROUND OF THE INVENTION

A. Field of the Invention

This invention pertains to apparatuses and methods regarding clutch assemblies and more specifically to apparatuses and methods regarding the use of a turbocharger to activate a vehicle clutch.

B. Related Background Art

There are many known methods for activating a vehicle clutch, such as a four wheel drive (4WD) clutch. Known methods include the use of: electromagnetic coils, electric motors combined with cams, electric motors combined with hydraulics, mechanical hydraulic pumps, viscous coupling fluids, etc. While such methods work well for their intended purpose, they have disadvantages. One disadvantage is the energy required to operate known clutches. The added energy requirements for clutch assemblies increase the power requirements for the vehicle engine, reducing engine efficiency and/or increasing costs.

What is needed is a method to activate a clutch using energy produced by an engine that is typically wasted. This invention achieves this goal. In this way the disadvantages known in the art can be overcome in a way that is better, more efficient and that provides better overall results.

II. SUMMARY OF THE INVENTION

According to one embodiment of this invention, a vehicle includes:
I. an engine that provides power for locomotion and that creates exhaust gas;
II. a plurality of ground engaging wheels;
III. a clutch assembly including:
   (a) an input shaft operatively connected to the engine;
   (b) an input clutch operatively connected to the input shaft;
   (c) an output shaft operatively connected to at least one of the plurality of ground engaging wheels to provide locomotion for the vehicle;
   (d) an output clutch operatively connected to the output shaft; and,
   (e) a pneumatic clutch engagement system that selectively engages the input clutch to the output clutch;
IV. a turbocharger assembly including:
   (a) a turbine assembly including:
      (1) a turbine housing having an inlet that receives exhaust gas from the engine and an outlet that discharges the exhaust gas; and,
      (2) a turbine wheel positioned within the turbine housing and having a shaft, wherein the turbine wheel is rotatable by the exhaust gas;
   (b) a compressor assembly including:
      (1) a compressor housing having an inlet that receives ambient air and an outlet that provides compressed air to activate the pneumatic clutch engagement system; and,
      (2) a compressor wheel positioned within the compressor housing, wherein the compressor wheel is rotatable by the turbine wheel shaft; and,
V. a control system used to control the operation of the clutch assembly and the turbocharger assembly.

According to another embodiment of this invention, the clutch assembly is a 4WD clutch assembly.

According to another embodiment of this invention, the vehicle is a front-engine, front-wheel drive (FF) vehicle.

According to another embodiment of this invention, the vehicle is a front-engine, rear-wheel drive (FR) vehicle.

According to still another embodiment of this invention, a method includes the steps of:
I. providing a vehicle including: an engine that provides power for locomotion; and, a plurality of ground engaging wheels;
II. providing the vehicle with a clutch assembly operatively connected to the engine and operatively connected to at least one of the ground engaging wheels;
III. providing the vehicle with a turbocharger assembly operatively connected to the engine and operatively connected to the clutch assembly; and,
IV. operating the turbocharger assembly to engage the clutch assembly to operatively connect for locomotion the engine to the at least one ground engaging wheel.

According to another embodiment of this invention, the operation includes the steps of sensing the pressure in a compressed air pipe that connects the turbocharger assembly with the clutch assembly; and, controlling the delivery of compressed air to the clutch assembly.

One advantage of this invention is that the energy from engine exhaust gas, which is typically wasted, can be used to activate a clutch.

Still other benefits and advantages of the invention will become apparent to those skilled in the art to which it pertains upon a reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

IV. DETAILED DESCRIPTION OF THE INVENTION

Figure 1:
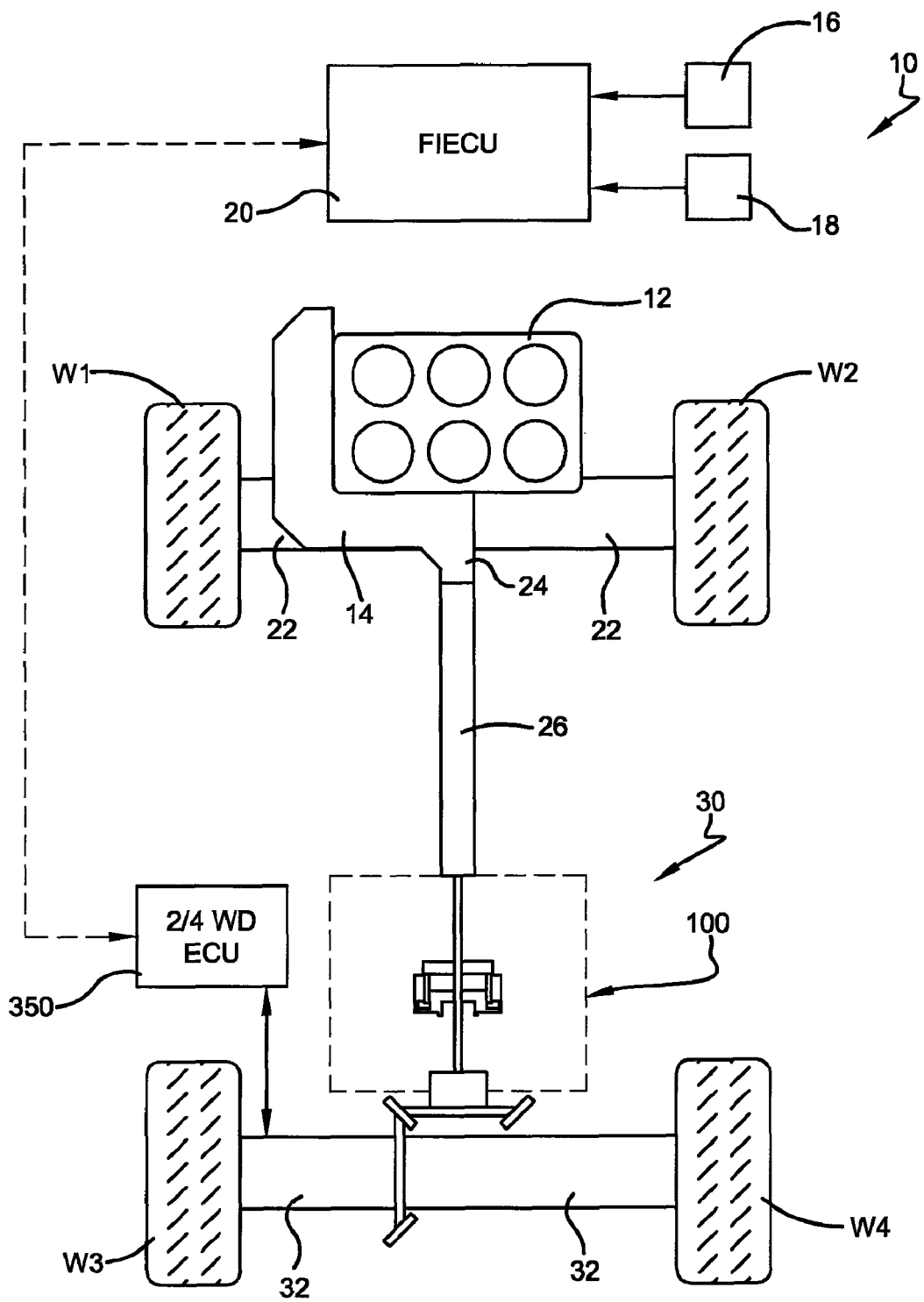
FIG. 1 is a schematic representation illustrating some of the primary components of a vehicle using this invention.
Figure 2:
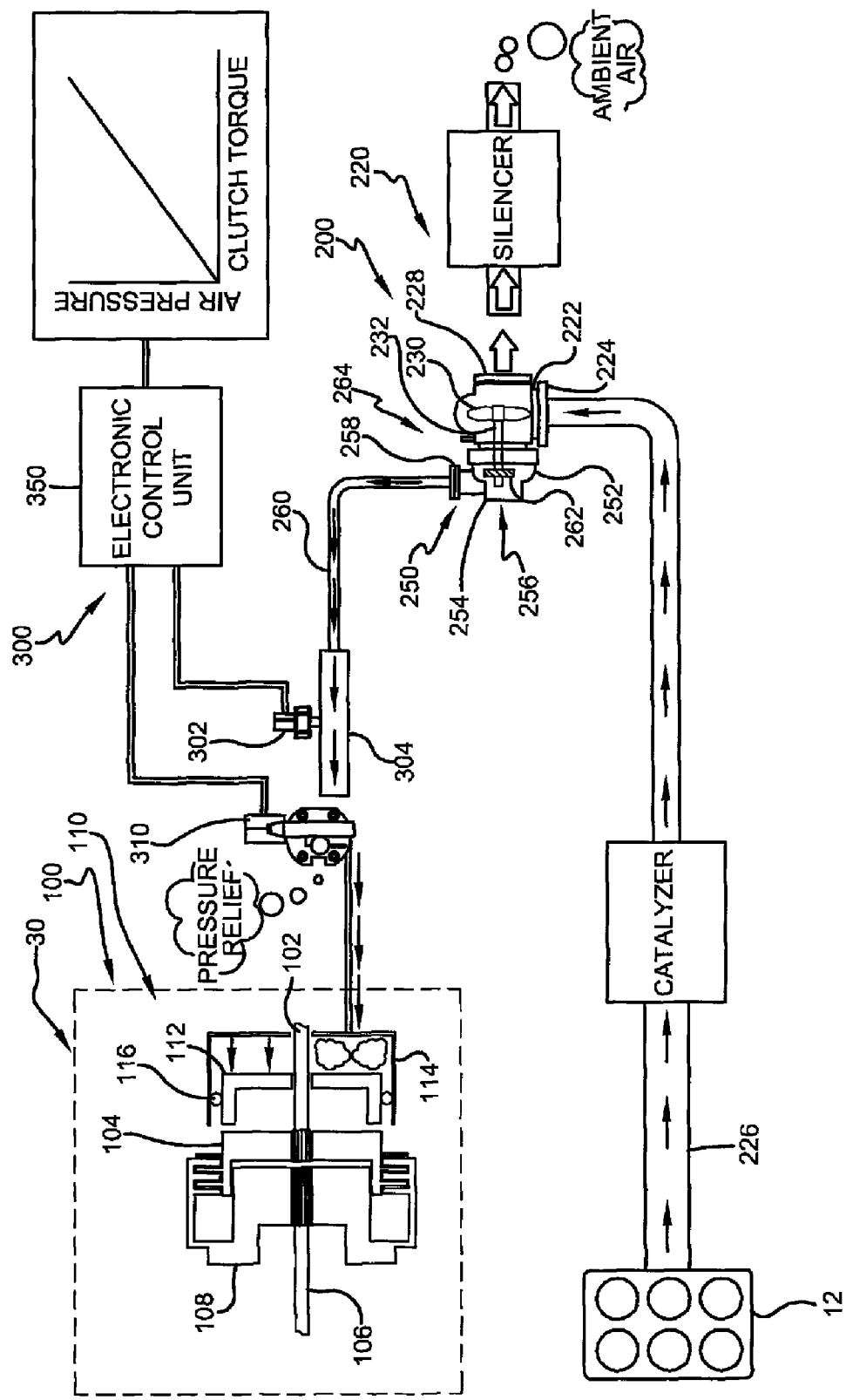
FIG. 2 is a schematic representation of additional components illustrating this invention including a close-up view of a portion of FIG. 1.

Referring now to the drawings wherein the showings are for purposes of illustrating embodiments of the invention only and not for purposes of limiting the same, FIGS. 1 and 2 schematically show the entire arrangement of a vehicle 10 that is adjustable between a 2 wheel drive (2WD) vehicle and a 4 wheel drive (4WD) vehicle and that incorporates a clutch assembly 100 and a turbocharger assembly 200 in accordance with this invention. The vehicle 10 may include an engine 12 mounted in a front portion of the vehicle and a transmission 14 integrally arranged with the engine 12 in any conventional manner. It should be noted that while the vehicle shown is a front-engine, front-wheel drive (FF) vehicle, this invention will also work well with a front-engine, rear-wheel drive (FR) vehicle, a rear-engine rear-drive (RR) vehicle, other vehicle types, and also with clutch assemblies not part of a vehicle. The transmission 14 may have a gear position sensor 16 and a shift position sensor 18 mounted therein. The gear position sensor 16 detects a gear position, and delivers a signal indicative of the detected gear position to a fuel injection electronic control unit (FIECU) 20. The shift position sensor 18 senses a selected shift position and delivers a shift position signal to the FIECU 20. The operation of the FIECU 20, transmission 14, and sensors 16, 18 are discussed in more detail in U.S. Pat. No. 6,587,775 titled DRIVING FORCE CONTROL SYSTEM FOR FOUR-WHEEL DRIVE VEHICLES, which is incorporated herein by reference. However, it should be noted that these components are not required for this invention.

With continuing reference to FIGS. 1 and 2, the engine 12 has an output shaft (not shown) operatively connected to left and right front ground engaging wheels W1, W2 as main drive wheels via the transmission 14, a front differential (not shown) and front drive shafts 22, 22. Further, the output shaft is connected to left and right rear ground engaging wheels W3, W4 as auxiliary drive wheels via the transmission 14, the front differential, a transfer 24, a propeller shaft 26, a rear differential 30, and left and right rear drive shafts 32, 32. The rear differential 30 may include the previously noted clutch assembly 100 which is used to connect and disconnect the propeller shaft 26 to and from the rear drive shafts 32, 32. In an alternate embodiment, the rear differential 30 may include a pair of clutch assemblies 100 that are used to individually connect and disconnect the propeller shaft 26 to and from the rear drive shafts 32, 32. When the clutch assembly 100 (or assemblies) disconnects the propeller shaft 26 from the rear drive shafts 32, 32, all the torque from the engine 12 is transmitted to the front wheels W1, W2, whereby the vehicle is set to a front wheel drive mode. However, when the clutch assembly 100 (or assemblies) connects the propeller shaft 26 to the rear drive shafts 32, 32, the torque of the engine 12 is also transmitted to the rear wheels W3, W4, whereby the vehicle is set to a four wheel drive (4WD) mode.

Still referring to FIGS. 1 and 2, the clutch assembly 100 may have an input shaft 102 operatively connected to the engine such as via the propeller shaft 26. An input clutch 104 may be operatively connected to the input shaft 102. In one embodiment, the input clutch 104 is fixed to the input shaft 102. The clutch assembly 100 may also have an output shaft 106 operatively connected to at least one of the rear wheels W3 or W4 such as via the rear drive shafts 32, 32. An output clutch 108 may be operatively connected to the output shaft 106. In one embodiment, the output clutch 108 is fixed to the output shaft 106. For the embodiment shown, each of the input clutch 104 and the output clutch 108 has four clutch plates. It should be understood, however, that the precise number of plates may vary depending on various circumstances including the specific type of clutch assembly 100 being used and on the torque to be transferred. This invention will work well regardless of such variations. The clutch assembly 100 may also have a pneumatic clutch engagement system 110 that selectively engages the input clutch 104 to the output clutch 108. The input clutch 104 can transfer torque, as is well known, when it is engaged to the output clutch 108. The pneumatic clutch engagement system 110 may include a piston 112 positioned within a cylinder 114. An o-ring 116 may be used to maintain an air seal within the cylinder 114 as is well known.

With continuing reference to FIGS. 1 and 2, the turbocharger assembly 200 may have a turbine assembly 220 and a compressor assembly 250. The turbine assembly 220 may include a turbine housing 222 having an inlet 224 that receives exhaust gas 226 from the engine 12 and an outlet 228 that discharges the exhaust gas 226. The turbine assembly 220 may also have a turbine wheel 230 positioned within the turbine housing 222 having a shaft 232. In a well none manner, the turbine wheel 230 may be rotated by the exhaust gas 226. The compressor assembly 250 may include a compressor housing 252 having an inlet 254 that receives ambient air 256 and an outlet 258 that provides compressed air 260 to the pneumatic clutch engagement system 110. The compressor assembly 250 may also include a compressor wheel 262 positioned within the compressor housing 252. The compressor wheel 262 may be rotated by the turbine wheel shaft 232 in a known manner. An oil system 264 may be provided to lubricate and/or cool the turbocharger assembly 200. The operation of a turbocharger is well known and thus will not be described in detail.

With continuing reference to FIGS. 1 and 2, a control system 300 may be used to control the operation of the clutch assembly 100 and the turbocharger assembly 200. In one embodiment, the control system 300 includes a pressure sensor 302 positioned in a pipe 304 that transfers compressed air 260 from the compressor assembly 250 to the pneumatic clutch engagement system 110 and a pressure control valve 310 operatively connected to the pipe 304. The control system 300 may also include a 2 wheel drive to 4 wheel drive electronic control unit (2/4WD-ECU) 350 which may be formed by a microcomputer in a known manner. The 2/4WD -ECU 350 receives a signal from the pressure sensor 302 regarding the pressure of the compressed air 260 in the pipe 304 and provides a signal to the pressure control valve 310 in order to control the pressure of the compressed air 260 that reaches the pneumatic clutch engagement system 110. The 2/4WD-ECU 350 may also be connected to the FIECU 20, the gear position sensor 16 and the shift position sensor 18. The 2/4WD-ECU 350 may then take the various inputs from the sensors and the FIECU 20 and determine the required signal to be delivered to the pressure control valve 310 in order to add (or subtract) either or both of the rear wheels W3, W4 as driving wheels. In one embodiment, illustrated in FIG. 2, adding additional air pressure to the pneumatic clutch engagement system 110 will increase the force of the piston 112 against the input clutch 104. The input clutch 104 engages the output clutch 108 as is commonly known and the torque of the clutch assembly 100 is thereby increased. Other control sequences chosen with sound engineering judgment will also work with this invention.

Figure 3:
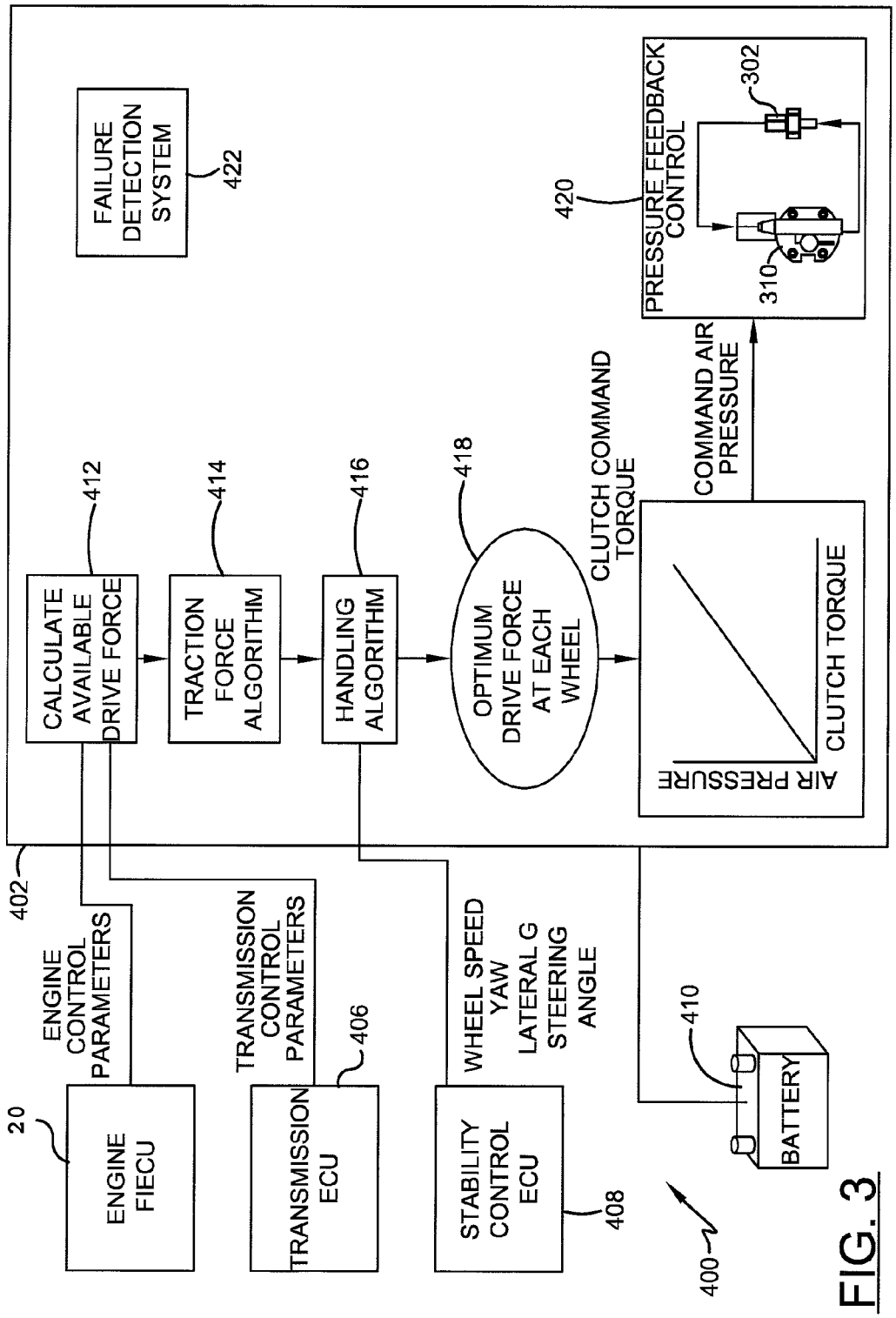
FIG. 3 is a schematic representation of a control system according to one embodiment of this invention.

With reference now to FIG. 3, an alternate and more complex control system 400 which may be used with this invention is illustrated. The control system 400 according to this embodiment, may include a 2 wheel drive to 4 wheel drive electronic control unit (4WD-ECU) 402, a fuel injection electronic control unit (FIECU) 20, a transmission electronic control unit 406, a stability control unit 408, and a battery 410 operatively connected together as shown or with revisions understood by a person of ordinary skill. The 4WD-ECU 402 may include a calculus module 412 that calculates the available drive force based on inputs from the FIECU 20 and the transmission electronic control unit 406. It may also include a traction force algorithm 414 and a handling algorithm 416 that receives input from the stability control unit 408. The 4WD-ECU 402 may include a microcomputer that can determine the optimum drive force for each wheel or axle as indicated at reference number 418. Based on the determined optimum drive force, the 4WD-ECU 402 can determine the proper clutch command torque and the corresponding command air pressure to be sent to the pressure control valve 310. With input from the pressure sensor 302, the 4WD-ECU 402 can form a feedback control 420 to properly adjust the clutch assembly. A failure detection system 422 may also be used. Because the use and operation of the components shown in FIG. 3 is known to a person of skill in the art, a detailed description of their use will not be provided.

Figure 4:
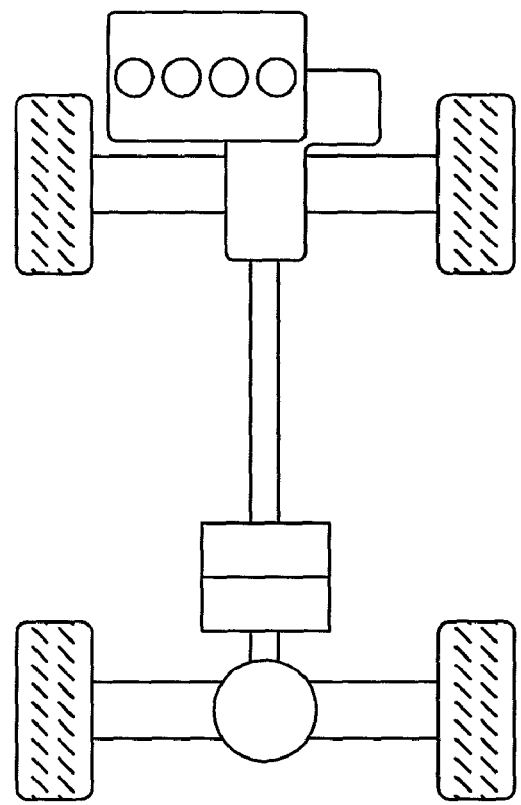
FIG. 4 is a schematic representation illustrating the use of this invention with a clutch located in the rear of the vehicle and used to control front/rear distribution.
Figure 4:
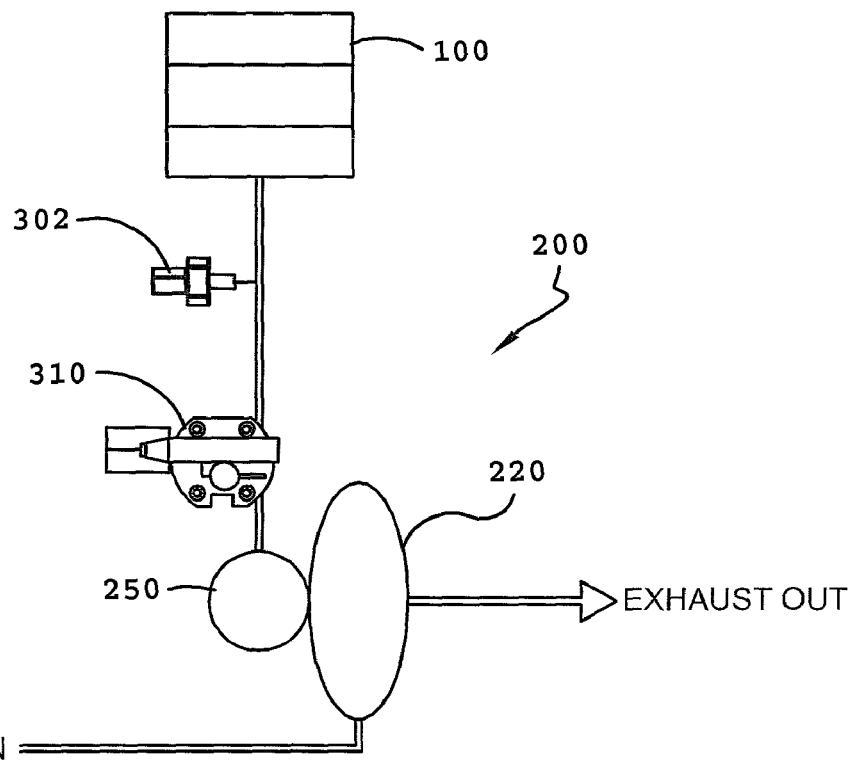
Figure 5:
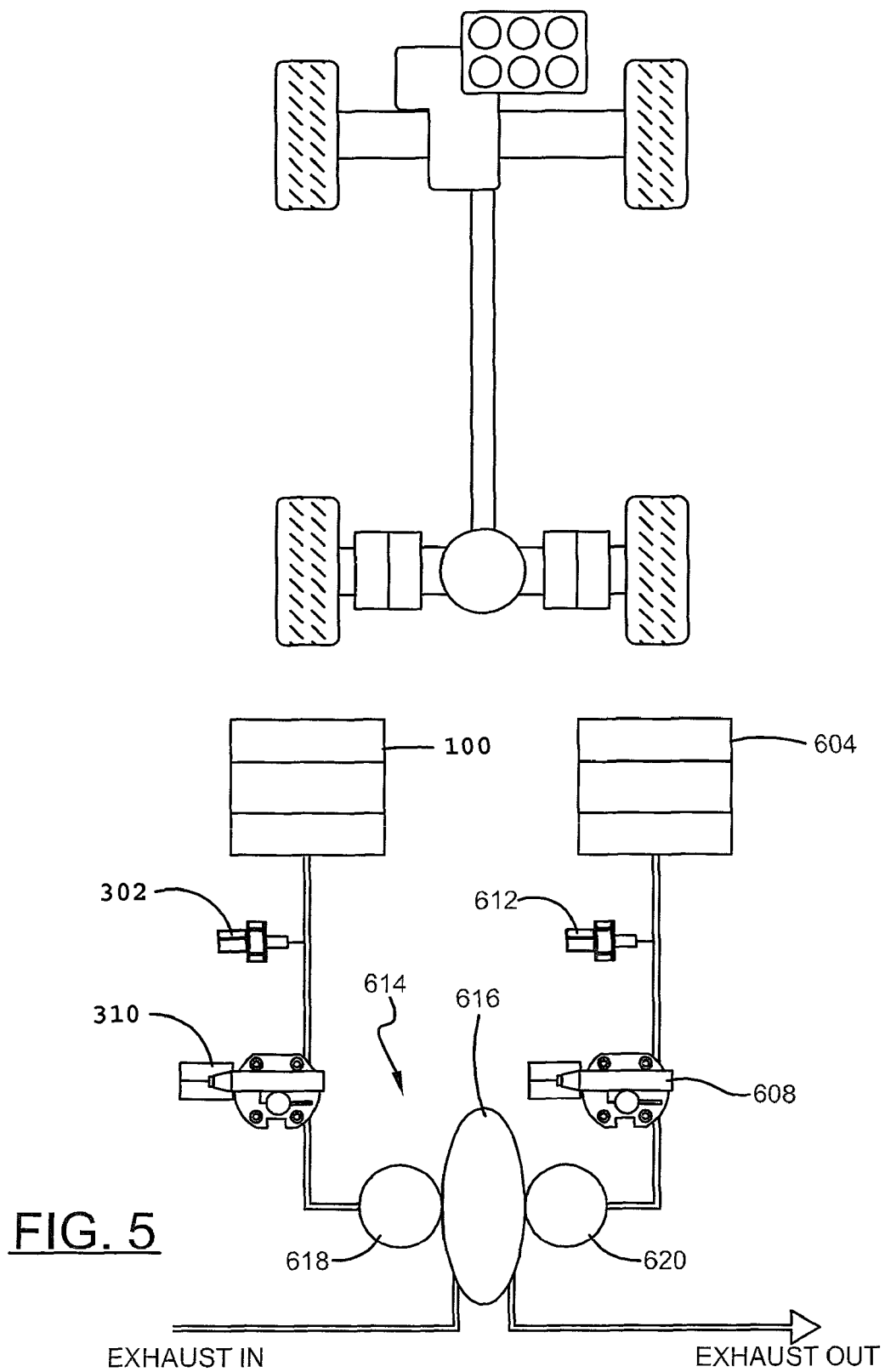
FIG. 5 is a schematic representation illustrating the use of this invention with a pair of clutches used to control front/rear distribution and left/right distribution.
Figure 6:
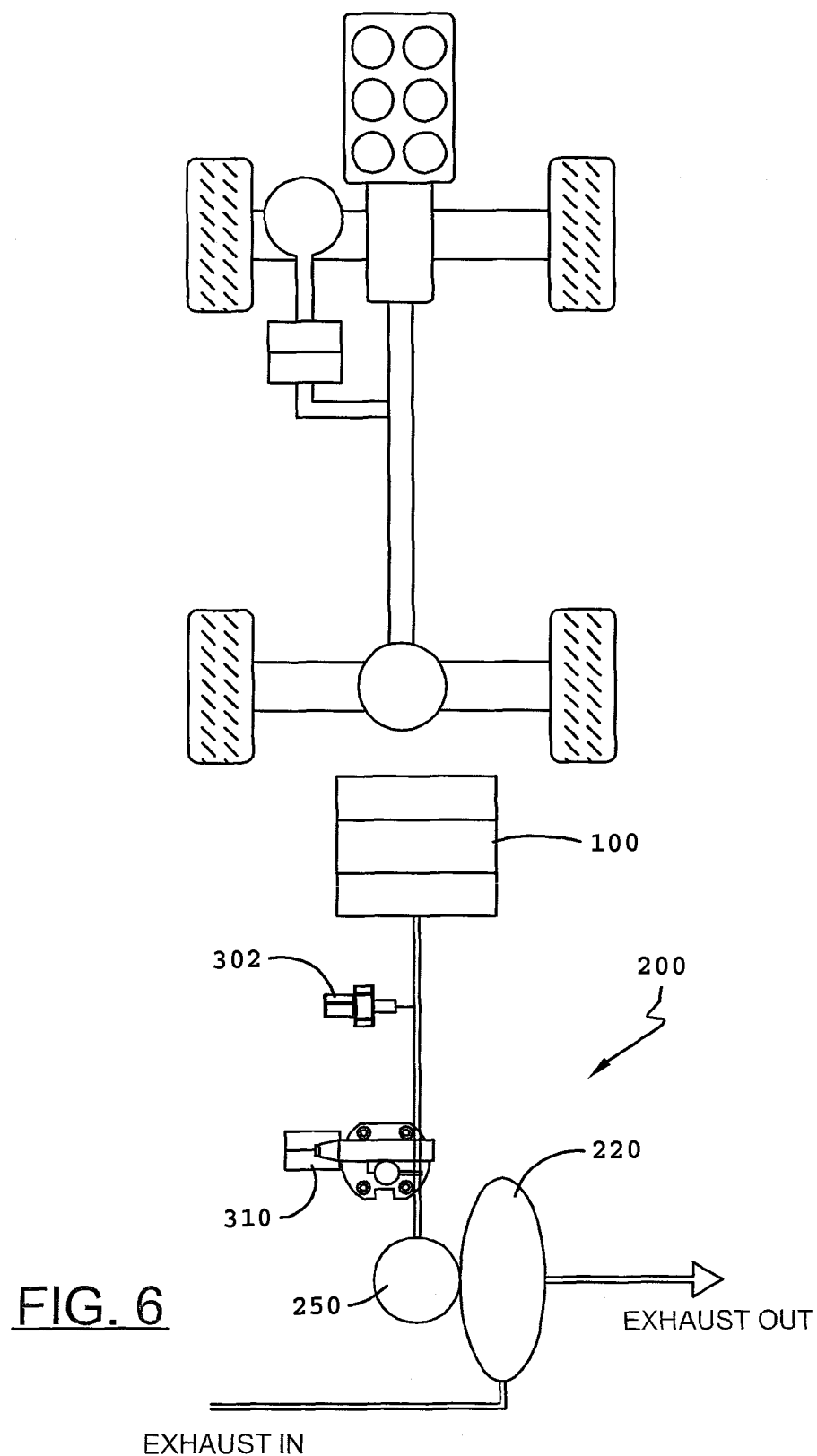
FIG. 6 is a schematic representation illustrating the use of this invention with a clutch located in the transfer case of the vehicle and used to control front/rear distribution.

Various embodiments have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof. FIGS. 4-6 illustrate some non-limiting examples of how this invention may be used.

FIG. 4 illustrates a front engine vehicle that is front wheel drive based and that includes an on-demand 4 wheel drive option. The clutch assembly 100 is operated with a pressure control valve 310, a pressure sensor 302, and a turbocharger assembly 200 having a turbine assembly 220 and a compressor assembly 250 operated similar to that described above. The clutch assembly 100 is used to control the distribution of engine torque between the front of the vehicle only (a 2 wheel drive condition) and a combination of the front and rear of the vehicle (a 4 wheel drive condition). For this embodiment, the clutch is located at the rear of the vehicle such as add to the rear differential, the transmission or the transfer case.

FIG. 5 illustrates a front engine vehicle that is front wheel drive based and that includes an on-demand 4 wheel drive option. This embodiment includes a pair of clutch assemblies 100, 604 that are each operated with a corresponding pressure control valve 310, 608 and pressure sensor 302, 612. A turbocharger assembly 614 having a turbine assembly 616 and a pair of compressor assemblies 618, 620 is used to operate both clutch assemblies 100, 604 similar to that described above. One of the clutch assemblies is used to control the distribution of engine torque between the front of the vehicle only (a 2 wheel drive condition) and a combination of the front and rear of the vehicle (a 4 wheel drive condition). The other clutch assembly is used to control the distribution of engine torque between the left side of the vehicle (the left front and left rear drive wheels) and the right side of the vehicle (the right front and right rear drive wheels). For this embodiment, the clutch assemblies are located at the rear of the vehicle in the rear differential.

FIG. 6 illustrates a front engine vehicle that is rear wheel drive based and that includes an on-demand 4 wheel drive option. The clutch assembly 100 is operated with a pressure control valve 310, a pressure sensor 302, and a turbocharger assembly 200 having a turbine assembly 220 and a compressor assembly 250 similar to that described above. The clutch assembly 100 is used to control the distribution of engine torque between the rear of the vehicle only (a 2 wheel drive condition) and a combination of the front and rear of the vehicle (a 4 wheel drive condition). For this embodiment, the clutch is located at the front of the vehicle such as to the transfer case.

Having thus described the invention, it is now claimed:

1. A vehicle comprising:
   an engine that provides power for locomotion and that creates exhaust gas;
   a plurality of ground engaging wheels;
   a first clutch assembly comprising:
   (a) an input shaft operatively connected to the engine;
   (b) an input clutch operatively connected to the input shaft;
   (c) an output shaft operatively connected to at least one of the plurality of ground engaging wheels to provide locomotion for the vehicle;
   (d) an output clutch operatively connected to the output shaft; and,
   (e) a pneumatic clutch engagement system that selectively engages the input clutch to the output clutch;
   a turbocharger assembly comprising:
   (a) a turbine assembly comprising:
       (1) a turbine housing having an inlet that receives exhaust gas from the engine and an outlet that discharges the exhaust gas; and,
       (2) a turbine wheel positioned within the turbine housing and having a shaft, wherein the turbine wheel is rotatable by the exhaust gas;
   (b) a first compressor assembly comprising:
       (1) a compressor housing having an inlet that receives ambient air and an outlet that provides compressed air to activate the pneumatic clutch engagement system; and,
       (2) a compressor wheel positioned within the compressor housing, wherein the compressor wheel is rotatable by the turbine wheel shaft; and,
   a control system used to control the operation of the first clutch assembly and the turbocharger assembly;
   wherein the outlet of the compressor provides compressed air only to the pneumatic clutch engagement system.

2. The vehicle of claim 1 wherein the clutch assembly is used to adjust the vehicle from 2 wheel drive to 4 wheel drive.

3. The vehicle of claim 2 wherein the vehicle is a front-engine, front-wheel drive (FF) vehicle.

4. The vehicle of claim 2 wherein the vehicle is a front-engine, rear-wheel drive (FR) vehicle.

5. The vehicle of claim 1 wherein:
   the plurality of ground engaging wheels comprise left and right side front wheels and left and right side rear wheels;
   the first clutch assembly is used to control the distribution of engine torque between the front wheels and the rear wheels;
   the vehicle further comprises a second clutch assembly comprising:
   (a) a second input shaft operatively connected to the engine;
   (b) a second input clutch operatively connected to the second input shaft;
   (c) a second output shaft operatively connected to at least one of the plurality of ground engaging wheels to provide locomotion for the vehicle;
   (d) a second output clutch operatively connected to the second output shaft; and,
   (e) a second pneumatic clutch engagement system that selectively engages the second input clutch to the second output clutch;
   wherein the turbocharger assembly further comprises a second compressor assembly comprising:
   (1) a second compressor housing having an inlet that receives ambient air and an outlet that provides compressed air to activate the second pneumatic clutch engagement system; and,
   (2) a second compressor wheel positioned within the second compressor housing, wherein the second compressor wheel is rotatable by the turbine wheel shaft;
   wherein the second clutch assembly is used to control the distribution of engine torque between the right side wheels and the left side wheels; and, wherein the control system is also used to control the operation of the second clutch assembly;

wherein the outlet of the second compressor provides compressed air only to the second pneumatic clutch engagement system.

6. The vehicle of claim 1 wherein the pneumatic clutch engagement system comprises:
a piston that is operated by the compressed air.

7. The vehicle of claim 1 wherein the control system comprises:
a pressure sensor operatively connected to a pipe that connects the compressor assembly to the pneumatic clutch engagement system;
a pressure control valve operatively connected to the pipe; and,
an electronic control unit that receives a signal from the pressure sensor and provides a signal to the pressure control valve.

8. A method comprising the steps of:
providing a vehicle comprising: an engine that provides power for locomotion; and, a plurality of ground engaging wheels;
providing the vehicle with a clutch assembly operatively connected to the engine and operatively connected to at least one of the ground engaging wheels;
providing the vehicle with a turbocharger assembly operatively connected to the engine and operatively connected to the clutch assembly, wherein the turbocharger assembly includes a turbine wheel and an air compressor having a compressor wheel operatively connected to the turbine wheel; and,
operating the turbocharger assembly to engage the clutch assembly to operatively connect for locomotion the engine to the at least one ground engaging wheel comprising the steps of:
drawing exhaust gas from the engine to rotate the turbine wheel and thereby the compressor wheel;
drawing ambient air into the air compressor; and,
delivering compressed air only to the clutch assembly.

9. The method of claim 8 wherein:
the step of, providing a vehicle comprising: an engine that provides power for locomotion; and, a plurality of ground engaging wheels, comprises the step of: providing at least two main drive wheels and two auxiliary drive wheels;
the step of, providing the vehicle with a clutch assembly operatively connected to the engine and operatively connected to at least one of the ground engaging wheels, comprises the step of: providing the clutch assembly as a 4WD clutch assembly;
the step of, operating the turbocharger assembly to engage the clutch assembly to operatively connect for locomotion the engine to the at least one ground engaging wheel, comprises the step of: connecting for locomotion the engine to the two auxiliary drive wheels to activate 4WD.

10. The method of claim 8 wherein the step of, operating the turbocharger assembly to engage the clutch assembly to operatively connect for locomotion the engine to the at least one ground engaging wheel, comprises the steps of:

sensing the pressure in a compressed air pipe that connects the turbocharger assembly with the clutch assembly; and,
controlling the delivery of compressed air to the clutch assembly.

11. An assembly comprising:
a clutch assembly comprising:
(a) an input shaft operatively connectable to an engine;
(b) an input clutch operatively connected to the input shaft;
(c) an output shaft;
(d) an output clutch operatively connected to the output shaft; and,
(e) a pneumatic clutch engagement system that selectively engages the input clutch to the output clutch;
a turbocharger assembly comprising:
(a) a turbine assembly comprising:
(1) a turbine housing having an inlet that receives gas and an outlet that discharges the gas; and,
(2) a turbine wheel positioned within the turbine housing and having a shaft, wherein the turbine wheel is rotatable by the gas;
(b) a compressor assembly comprising:
(1) a compressor housing having an inlet that receives ambient air and an outlet that provides compressed air to activate the pneumatic clutch engagement system; and,
(2) a compressor wheel positioned within the compressor housing, wherein the compressor wheel is rotatable by the turbine wheel shaft;
wherein the outlet of the compressor provides compressed air only to the pneumatic clutch engagement system.

12. The assembly of claim 11 further comprising:
a control system used to control the operation of the clutch assembly and the turbocharger assembly.

13. The assembly of claim 12 wherein the control system comprises:
a pressure sensor operatively connected to a pipe that connects the compressor assembly to the pneumatic clutch engagement system;
a pressure control valve operatively connected to the pipe; and,
an electronic control unit that receives a signal from the pressure sensor and provides a signal to the pressure control valve.

14. The assembly of claim 11 wherein the clutch assembly is a 4WD clutch assembly for a vehicle having a plurality of ground engaging wheels and the output shaft is operatively connectable to at least one of the plurality of ground engaging wheels to provide locomotion for the vehicle.

15. The assembly of claim 11 wherein:
the turbine housing inlet receives exhaust gas from an engine and the outlet discharges the exhaust gas; and,
the turbine wheel is rotatable by the exhaust gas.

16. The assembly of claim 11 wherein the pneumatic clutch engagement system comprises:
a piston that is operated by the compressed air.

* * * * *